United States Patent
Baik

(10) Patent No.: US 8,989,480 B2
(45) Date of Patent: Mar. 24, 2015

(54) METHOD, COMPUTER-READABLE MEDIUM AND APPARATUS ESTIMATING DISPARITY OF THREE VIEW IMAGES

(75) Inventor: Aron Baik, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1062 days.

(21) Appl. No.: 12/911,332

(22) Filed: Oct. 25, 2010

(65) Prior Publication Data

US 2011/0116706 A1    May 19, 2011

(30) Foreign Application Priority Data

Nov. 19, 2009    (KR) .................. 10-2009-0111876

(51) Int. Cl.
  G06K 9/00    (2006.01)
  G06K 9/66    (2006.01)
  G06T 7/00    (2006.01)

(52) U.S. Cl.
  CPC ..... *G06T 7/0022* (2013.01); *G06T 2207/10012* (2013.01); *G06T 2207/20228* (2013.01)
  USPC ........................... 382/154; 382/190; 382/106

(58) Field of Classification Search
  USPC .................. 382/215, 154, 190, 106
  See application file for complete search history.

(56) References Cited

U.S. PATENT DOCUMENTS

| | | | | |
|---|---|---|---|---|
| 7,599,547 | B2 * | 10/2009 | Sun et al. | 382/154 |
| 7,844,107 | B2 * | 11/2010 | Jeong et al. | 382/154 |
| 8,315,426 | B2 * | 11/2012 | Yea et al. | 382/100 |
| 2004/0223640 | A1 * | 11/2004 | Bovyrin | 382/154 |
| 2005/0232509 | A1 * | 10/2005 | Blake et al. | 382/275 |
| 2005/0232510 | A1 * | 10/2005 | Blake et al. | 382/275 |
| 2006/0082575 | A1 | 4/2006 | Auberger et al. | |
| 2006/0120594 | A1 * | 6/2006 | Kim et al. | 382/154 |
| 2006/0193509 | A1 * | 8/2006 | Criminisi et al. | 382/154 |
| 2008/0172384 | A1 * | 7/2008 | Cai et al. | 707/6 |
| 2008/0201101 | A1 * | 8/2008 | Hebert et al. | 702/152 |
| 2009/0041336 | A1 * | 2/2009 | Ku et al. | 382/154 |
| 2009/0067705 | A1 * | 3/2009 | Yu et al. | 382/154 |
| 2009/0180672 | A1 * | 7/2009 | Ishiyama | 382/118 |
| 2010/0027874 | A1 * | 2/2010 | Jeong et al. | 382/154 |
| 2010/0103249 | A1 * | 4/2010 | Lipton et al. | 348/51 |
| 2010/0245535 | A1 * | 9/2010 | Mauchly | 348/14.08 |
| 2011/0044531 | A1 * | 2/2011 | Zhang et al. | 382/154 |
| 2011/0091096 | A1 * | 4/2011 | Morris et al. | 382/154 |
| 2011/0110583 | A1 * | 5/2011 | Zhang et al. | 382/154 |
| 2011/0200248 | A1 * | 8/2011 | Gerones et al. | 382/154 |

FOREIGN PATENT DOCUMENTS

| | | |
|---|---|---|
| KR | 1999-0070445 | 9/1999 |
| KR | 2002-0007894 | 1/2002 |
| KR | 2002-0095752 | 12/2002 |
| KR | 10-2005-0058085 | 6/2005 |
| KR | 10-2005-0102156 | 10/2005 |
| KR | 10-2006-0023714 | 3/2006 |

(Continued)

*Primary Examiner* — Kathleen Y Dulaney
(74) *Attorney, Agent, or Firm* — NSIP Law

(57) ABSTRACT

Provided is a method, computer-readable medium apparatus that may estimate a disparity of three view images. A global matching may be performed to calculate a global path by performing a dynamic programming on the three view images, and a local matching for supplementing an occlusion region of the calculated global path may be performed, and thereby a disparity estimation of the three view images may be performed.

24 Claims, 9 Drawing Sheets

(56) References Cited

FOREIGN PATENT DOCUMENTS

| | | |
|---|---|---|
| KR | 10-2006-0063480 | 6/2006 |
| KR | 10-2006-0063558 | 6/2006 |
| KR | 10-2007-0061011 | 6/2007 |
| KR | 10-2007-0061094 | 6/2007 |
| KR | 10-2008-0043576 | 5/2008 |
| KR | 10-2008-0051015 | 6/2008 |
| KR | 10-2009-0062440 | 6/2009 |
| KR | 10-2009-0068943 | 6/2009 |

* cited by examiner

Global Matching

Local Matching ($v_1, v_2$)

Local Matching ($v_2, v_3$)

METHOD, COMPUTER-READABLE MEDIUM AND APPARATUS ESTIMATING DISPARITY OF THREE VIEW IMAGES

CROSS-REFERENCE TO RELATED APPLICATIONS

This application claims the benefit of Korean Patent Application No. 10-2009-0111876, filed on Nov. 19, 2009, in the Korean Intellectual Property Office, the disclosure of which is incorporated herein by reference.

BACKGROUND

1. Field

Example embodiments relate to a method, a computer-readable medium and an apparatus that may estimate a disparity of three view images, and more particularly, to a method, computer-readable medium and apparatus that may estimate a disparity of three view images by performing a global matching and a local matching.

2. Description of the Related Art

Recently, interest in three-dimensional (3D) images has greatly increased, and there has been active study into 3D images.

In general, a human being may experience a significant 3D effect created by a parallax between left and right eye views, and 3D images may be acquired using the above described characteristic. For example, a specific subject may be divided into a left image viewed by a left eye of a viewer and a right image viewed by a right eye of the viewer to simultaneously display the left image and the right image, so that the viewer can view the specific subject as the 3D image.

In addition, to estimate a disparity of two view images, a disparity map may be effectively estimated using a two-view dynamic programming scheme. In this regard, there is a desire for an apparatus, computer-readable medium and method that may effectively estimate a disparity of the three view images when the three view images are inputted.

SUMMARY

The foregoing and/or other aspects are achieved by providing an apparatus estimating a disparity of three view images, the apparatus including a global matching unit to perform dynamic programming on three views, the three views corresponding to a left view, a center view, and a right view, to extract a disparity map and an occlusion map of each of the three views, a local matching unit to perform the dynamic programming on two neighboring views of the three views to extract two disparity maps where an occlusion region of the disparity map is supplemented, and a final map calculation unit to calculate a final disparity map by combining the two disparity maps.

In this instance, the global matching unit may include: a path calculation unit to calculate a first path in three-dimensional (3D) coordinates where a cumulative value of a movement cost is a minimum, a map calculation unit to calculate the disparity map by projecting the calculated first path to each axis of the 3D coordinates, and an occlusion map calculation unit to calculate the occlusion map including information about the occlusion region based on the calculated first path, wherein the 3D coordinates are obtained by configuring an x-axis value of each of the left view, the center view, and the right view to correspond to a value of each of a first-axis, a second-axis, and a third-axis of the 3D coordinates.

Also, the path calculation unit may include: a local path calculation unit to calculate a local path having a minimum movement cost from among a first movement cost for a first movement where each value on the first-axis, the second-axis, and the third-axis is increased by 1 unit, a second movement cost for a second movement where the value on the first-axis is increased by 1 unit, the value on the second-axis is increased by 0.5 units, and the value on the third-axis is not increased, and a third movement cost for a third movement where the value on the first-axis is not increased, the value on the second-axis is increased by 0.5 units, and the value on the third-axis is increased by 1 unit; and a global path calculation unit to calculate a global path where the local paths are combined, by performing a back tracking operation in a direction of an arrival point of the first path to a starting point of the first path.

Also, the occlusion map may be a binary map where a value of the occlusion map is determined as one of 0 and 1.

Also, the local matching unit may calculate a second path where a sum of a cumulative value and a tracking value is a minimum, the cumulative value being where the movement cost is a minimum, and the tracking value signifying a degree of separation from the global path.

Also, the local matching unit may not apply the occlusion region of the occlusion map when calculating the tracking value.

Also, the final map calculation unit may calculate the final disparity map by determining, as a disparity value of the final disparity map with respect to the center view, a minimum from among disparity values of the two disparity maps.

The foregoing and/or other aspects are achieved by providing a method of estimating a disparity of three view images, the method including performing a dynamic programming on three views, the three views corresponding to a left view, a center view, and a right view, to extract a disparity map and an occlusion map of each of the three views, performing the dynamic programming on two neighboring views from among the three views to extract two disparity maps where an occlusion region of the disparity map is supplemented, and calculating a final disparity map by combining the two disparity maps.

In this instance, the performing of the dynamic programming on three views may include calculating a first path on 3D coordinates where a cumulative value of a movement cost is a minimum, calculating the disparity map by projecting the calculated first path to each axis of the 3D coordinates, and calculating the occlusion map including information about the occlusion region based on the calculated first path, wherein the 3D coordinates are obtained by configuring an x-axis value of each of the left view, the center view, and the right view to correspond to a value of each of a first-axis, a second-axis, and a third-axis of the 3D coordinates.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
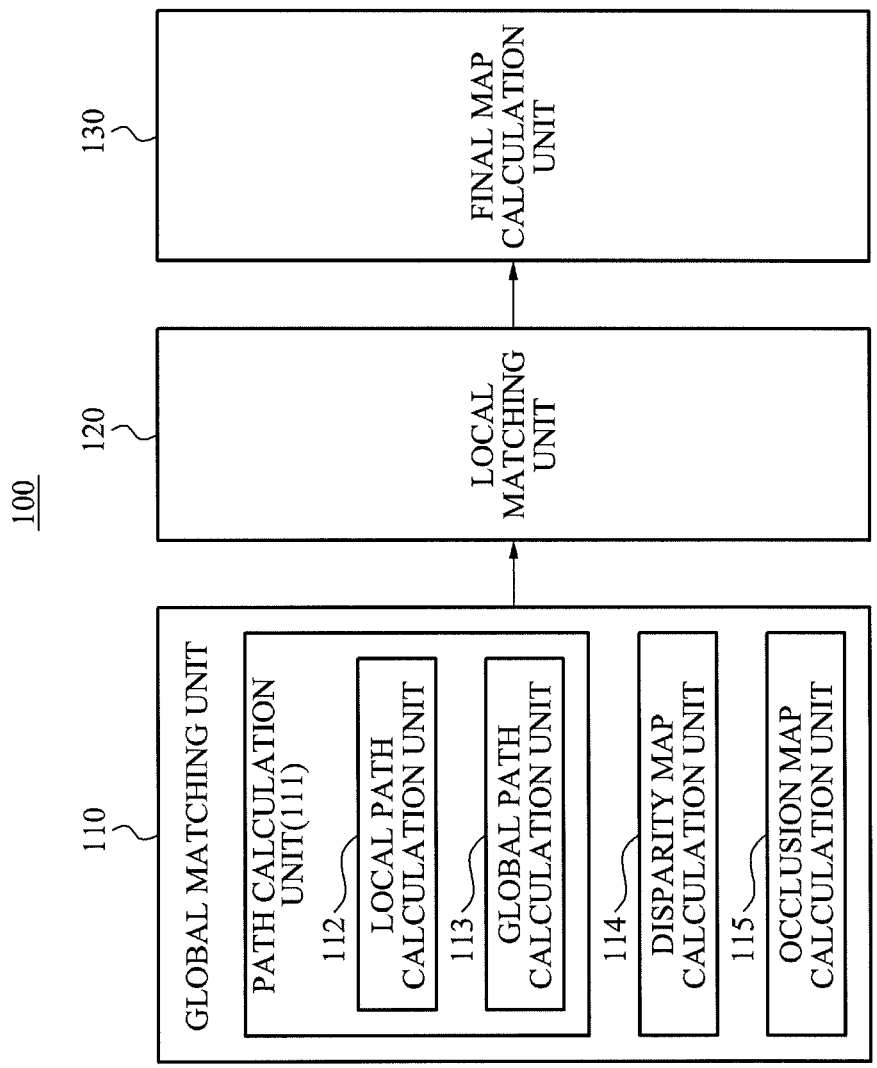
FIG. 1 is a block diagram illustrating an apparatus estimating a disparity of three view images according to exemplary embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 is a block diagram illustrating an apparatus 100 of estimating a disparity of three view images according to exemplary embodiments.

Referring to FIG. 1, the apparatus 100 includes a global matching unit 110, a local matching unit 120, and a final map calculation unit 130.

The global matching unit 110 may perform dynamic programming on three views corresponding to a left view, a center view, and a right view to extract a disparity map and an occlusion map of each of the three views. Specifically, to perform disparity estimation on a three view input, dynamic programming may be simultaneously performed on the three view input, to extract the disparity map and the occlusion map for each of the three views.

The global matching unit 110 may include a path calculation unit 111, a disparity map calculation unit 114, and an occlusion map calculation unit 115.

The path calculation unit 111 may calculate a first path in three dimensional (3D) coordinates where a cumulative value of a movement cost is a minimum. Here, the 3D coordinates are obtained by configuring an x-axis value of each of the left view, the center view, and the right view to correspond to a value of each of a first-axis, a second-axis, and a third-axis of the 3D coordinates.

The local path calculation unit 112 may calculate a local path having a minimum movement cost from among a first movement cost for a first movement where each value on the first-axis, the second-axis, and the third-axis is increased by 1 unit, a second movement cost for a second movement where the value on the first-axis is increased by 1 unit, the value on the second-axis is increased by 0.5 units, and the value on the third-axis is not increased, and a third movement cost for a third movement where the value on the first-axis is not increased, the value on the second-axis is increased by 0.5 units, and the value on the third-axis is increased by 1 unit.

Specifically, the local path calculation unit 112 may calculate the local path having the minimum movement cost for each unit grid in the 3D coordinates.

The global path calculation unit 113 may calculate a global path where the local paths are combined, by performing a back tracking operation in a direction of an arrival point of the first path to a starting point of the first path. Specifically, using the back tracking operation, a path where a movement cost is a minimum may be easily found.

In addition, a process of configuring the 3D coordinates using the three view images and the values of the X-axis will be further described with reference to FIGS. 2 and 3.

Figure 2:
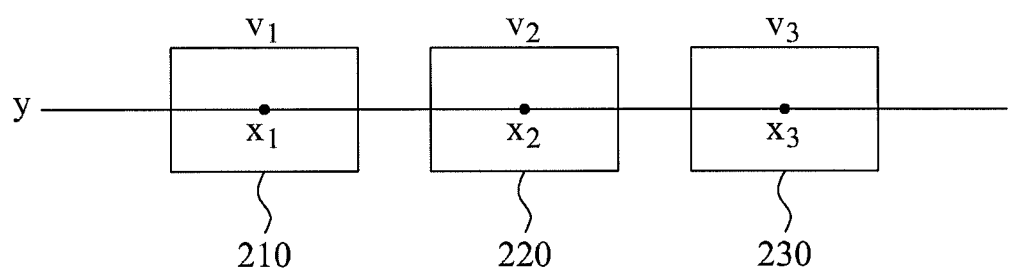
FIG. 2 illustrates three view images on the same Epipolar line according to exemplary embodiments.

FIG. 2 illustrates three view images on the same Epipolar line according to exemplary embodiments.

Referring to FIG. 2, a left view image 210, a center view image 220, and a right view image 230 may be determined as $x_1$, $x_2$, and $x_3$, that is, values of the X-axis on the same Epipolar line, and $x_1$, $x_2$, and $x_3$ may be configured as the values of the first axis, the second axis, and the third axis of the 3D coordinates. Here, a base line of the left view image 210 and the center view image 220 and a base line of the center view image 220 and the right view image 230 may be the same. Also, $x_2=(x_1+x_3)/2$ may be satisfied.

Figure 3:
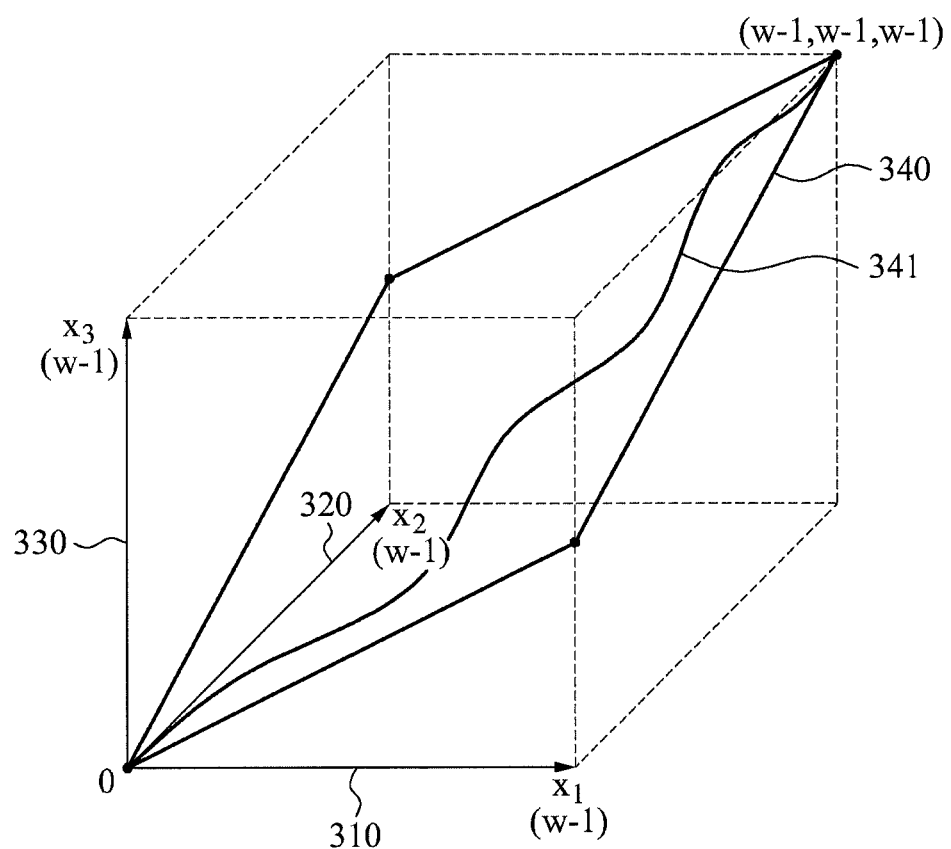
FIG. 3 is a diagram used for describing a process of calculating a global path by performing a dynamic programming on three view images according to exemplary embodiments.

FIG. 3 is a diagram used for describing a process of calculating a global path by performing dynamic programming on three view images according to exemplary embodiments.

Referring to FIG. 3, 3D coordinates including $x_1$, $x_2$, and $x_3$ of FIG. 2 are configured as values of a first axis 310, a second axis 320, and a third axis 330 of the 3D coordinates, a global path 341 where a cost for moving from a starting point (0, 0, 0) to an arrival point (w−1, w−1, w−1) is a minimum may be calculated. Here, 'w' may indicate a width of a view image.

In this instance, a plurality of paths used for the cost of moving from the starting point (0, 0, 0) to the arrival point (w−1, w−1, w−1) may exist, however, a path satisfying $x_2=(x_1+x_3)/2$ may exist on a plane 340. Accordingly, to calculate a path where the cost is a minimum within the plane 340, a method of calculating an optimal path using the dynamic programming may be used.

Also, to calculate the global path, a movement to an arrival point comprising three movements may be defined, which will be described in detail with reference to FIG. 4.

Figure 4:
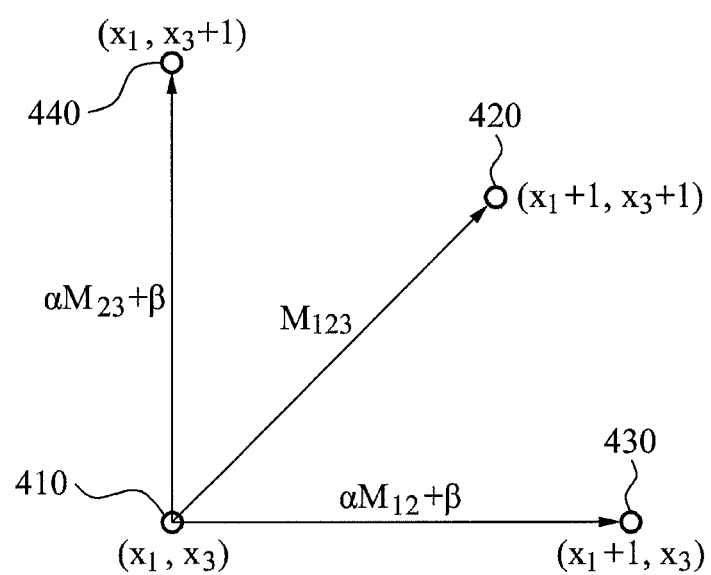
FIG. 4 is a diagram used for describing three movements for determining a path according to exemplary embodiments.

FIG. 4 is a diagram used for describing the three movements for determining a path according to exemplary embodiments.

Referring to FIG. 4, the three movements may be configured of a first movement where a value ($x_1$) of a first axis and a value ($x_3$) of a third axis are increased by 1 unit, a second movement where the value of the first axis is increased by 1 unit and the value of the third axis is not increased, and a third movement where the value of the first axis is not increased and the value of the third axis is increased by 1 unit.

Here, a value ($x_2$) of a second axis may be determined depending on whether $x_2=(x_1+x_3)/2$ is satisfied, and thus the value of the second axis is increased by 1 unit in a case of the first movement, and the value of the second axis is increased by 0.5 units in cases of the second movement and the third movement.

In addition, to determine a local path where a cumulative value of a movement cost is a minimum in a current location 420, a cumulative value of a movement cost reaching up to positions 410, 430, and 440 prior to a movement and a matching cost for the cost for moving from the positions 410, 430, and 440 prior to the movement to a current position 420 may be added-up, and a path where the added-up value is a minimum may be determined as the local path. Accordingly, the cumulative value where the movement cost is a minimum may be defined by the following Equation 1.

$$C_{123}(x_1, x_3) = \min \begin{cases} C_{123}(x_1-1, x_3-1) + M_{123}(x_1, x_2, x_3) \\ C_{123}(x_1-1, x_3) + \alpha M_{12}(x_1, x_2) + \beta \\ C_{123}(x_1, x_3-1) + \alpha M_{23}(x_2, x_3) + \beta, \end{cases}$$

$$\text{where } x_2 = \frac{x_1 + x_3}{2}$$

[Equation 1]

Here, $C_{123}$ denotes a value where a cumulative movement cost starting from (0, 0, 0) is a minimum, α denotes a scalar weight with respect to an occlusion matching cost, and β denotes a constant with respect to the occlusion matching cost.

For example, the occlusion matching cost may be determined as illustrated in the following Equation 2.

$$M_{123}(x_1,x_2,x_3) = |Y_1(x_1)-Y_2(x_2)| + |Y_2(x_2)-Y_3(x_3)|,$$

$$M_{12}(x_1,x_2) = |Y_1(x_1)-Y_2(x_2)|, \text{ and}$$

$$M_{23}(x_2,x_3) = |Y_2(x_2)-Y_3(x_3)|$$

[Equation 2]

Here, Y(x) denotes an intensity of a pixel x. In addition, to calculate the matching cost, various values as well as the intensity may be used.

Referring again to FIG. 1, the disparity map calculation unit 114 may calculate a disparity map by projecting the calculated first path to each axis of the 3D coordinates. Specifically, a disparity with respect to each view may be determined as illustrated in the following Equation 3.

$$D_1(x_1) = D_2(x_2) = D_3(x_3) = x_1 - x_2$$

[Equation 3]

Accordingly, when the global path in the 3D coordinates is determined, a disparity map with respect to each view may be calculated using Equation 3.

The occlusion map calculation unit 115 may calculate an occlusion map including information about an occlusion region, based on the calculated first path. The occlusion map may be a binary map where a value of a map corresponding to the occlusion region is designated as one of '0' and '1'.

A process of calculating the disparity map and the occlusion map will be further described with reference to FIG. 5.

Figure 5:
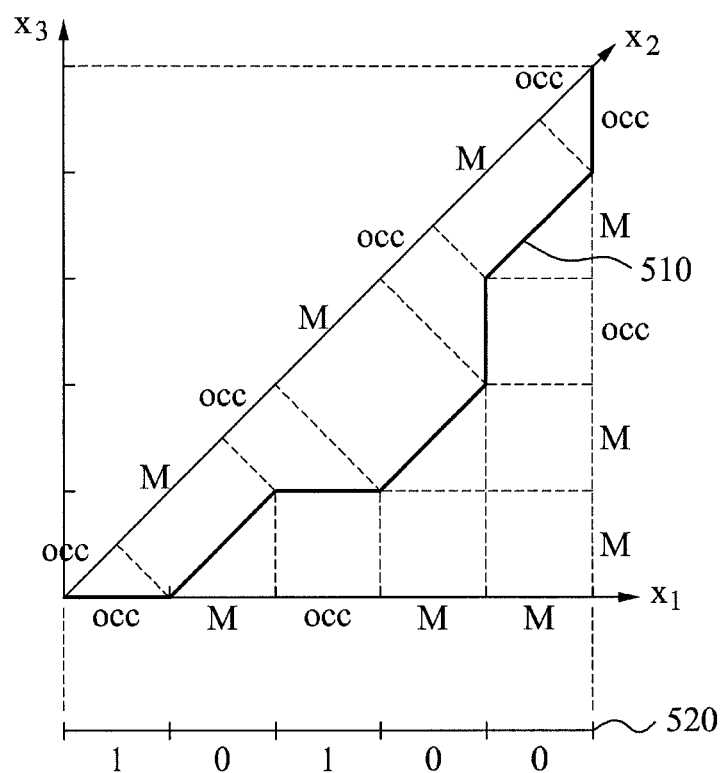
FIG. 5 illustrates a global path calculated by a dynamic programming performed on three view images according to exemplary embodiments.

FIG. 5 illustrates a global path calculated by dynamic programming performed on three view images according to exemplary embodiments.

Referring to FIG. 5, when a global path 510 is determined in 3D coordinates, a disparity map with respect to each view may be calculated from the global path 510. In this instance, an occlusion region with respect to each view may be determined, and an occlusion map with respect to each view may be calculated together. For example, as to an occlusion map 520 for $x_1$, it may be determined whether an occlusion region where the global path 510 is projected in an $x_1$ axis exists for each interval, and a value of a map corresponding to the occlusion region may be designated as one of '0' and '1'. Accordingly, the occlusion map may be a binary map configured of '0' or '1'.

As described above, the disparity map and the occlusion map may be extracted by performing the dynamic programming on the three view images. However, the disparity map may have a significant occlusion region where disparity information is to be filled, due to an ordering constraint. Accordingly, a local matching for filling the occlusion region with the disparity information may be performed as below.

Figure 6:
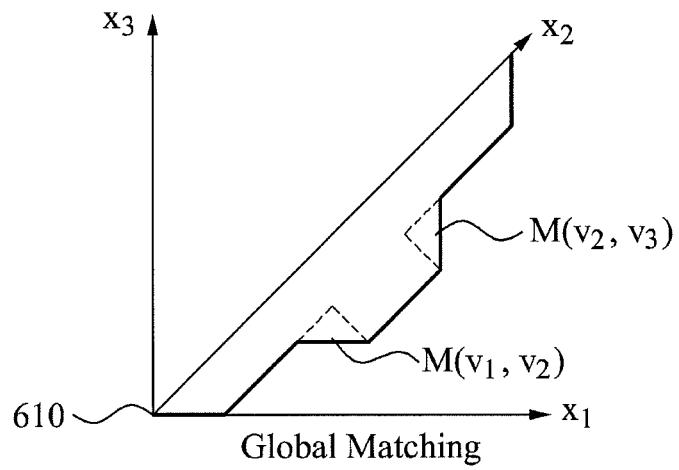
FIG. 6 is a diagram used for describing a local matching for supplementing an occlusion region of the global path of FIG. 5.
Figure 6:
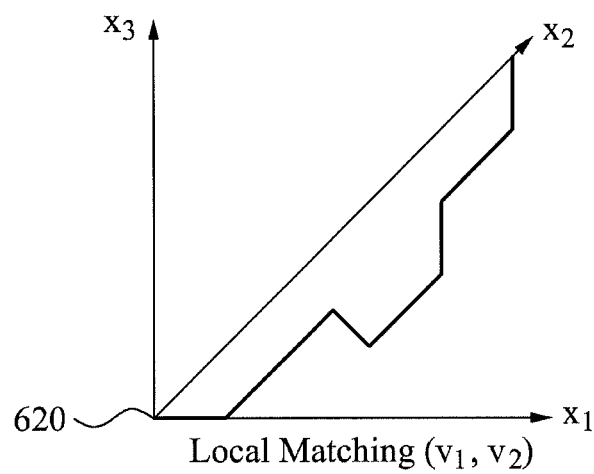
Figure 6:
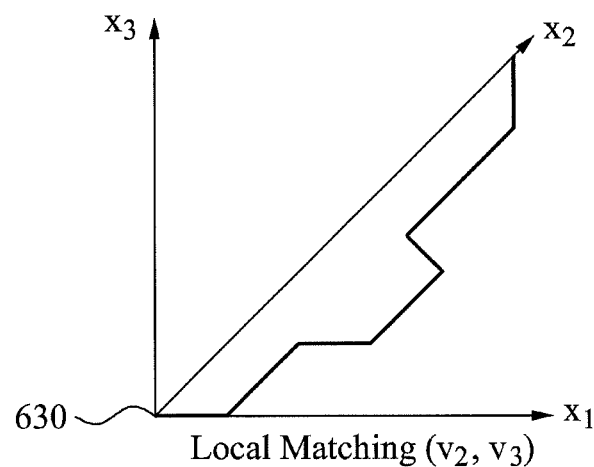

Referring again to FIG. 1, the local matching unit 120 may perform the dynamic programming on two neighboring views of the three views to extract two disparity maps where the occlusion region of the disparity map is supplemented. Specifically, for the left view and the center view, and for the center view and the right view, a second path of which a sum of a cumulative value, where a movement cost is a minimum, and a tracking value signifying a degree of being separated from the global path is a minimum may be respectively calculated, and a disparity map may be extracted from the calculated respective second paths. FIG. 6 illustrates, a process of filling, with the disparity information, the occlusion region of the global path with respect to the three views calculated by performing the local matching.

Referring to FIG. 6, as described above, when a global matching 610 on the three views is performed to calculate a global path and to extract a disparity map from the global path, the occlusion region where the disparity information is to be filled may be significantly large due to the ordering constraint. Accordingly, to overcome this problem, local matching of neighboring views may be performed. In particular, local matching 620 the left view and the center view, and local matching 630 the center view and the right view, may be performed.

For instance, for the local matching, dynamic programming with respect to the left view and the center view may be performed in accordance with the following Equation 4.

$$C_{12}(x_1, x_2) = \gamma T_{12}(x_1, x_2) + \min \begin{cases} C_{12}(x_1-1, x_2-1) + M_{12}(x_1, x_2) \\ C_{12}(x_1-1, x_2) + \beta' \\ C_{12}(x_1, x_2-1) + \beta', \end{cases}$$

[Equation 4]

where $T_{12}(x_1,x_2) = |x_1-(x_2+D_1(x_1))|(1-O_1(x_1)) + |x_2-(x_1+D_2(x_2))|(1-O_2(x_2))$ Here, $T_{12}(x_1, x_2)$ denotes a tracking value, i.e., a value signifying a degree of being separated from the global path calculated through the global matching, and β' denotes a constant.

Regarding values for calculating $T_{12}(x_1, x_2)$, in a grid having an $x_1$-axis and an $x_2$-axis, disparities $D_1(x_1)$ and $D_2(x_2)$ may be obtained by projecting an arbitrary point $(x_1, x_2)$ to the $x_1$-axis and the $x_2$-axis. Also, using $x_2$ and the Equation represented by $D_1(x_1) = x_1 - x_2$, $x_1' = x_2 + D_1(x_1)$ may be obtained. Specifically, $x_1'$ may rely on the global path calculated by the global matching and thus, a great difference between $x_1'$ and $x_1$ may denote a great degree of being separated from the global path. Accordingly, when a difference between $x_1'$ and $x_1$ is great, $T_{12}(x_1, x_2)$ may increase to lead to an increase of $C_{12}(x_1, x_2)$, and thus, a path relying on $x_1$ having a great difference with $x_1'$ may not be selected.

In this instance, to not apply a tracking value to an occlusion region, an absolute value of a difference between $x_1'$ and $x_1$ may be multiplied by $1-O_1(x_1)$. Specifically, since $O_1(x_1)$ is '1' and $1-O_1(x_1)$ is '0' in the occlusion region, the tracking value may be not applied to the occlusion region upon calculating $C_{12}(x_1, x_2)$.

As for the center view and the right view, the local matching may be performed in the same manner as in Equation 4.

As described above, the local matching may be performed on the left view and the center view and on the center view and the right view. Thus, disparities $D_{21}(x_2) = x_1 - x_2$ and $D_{23}(x_2) = x_2 - x_3$ may be calculated.

The final map calculation unit 130 may combine the two disparity maps to calculate a final disparity map. To calculate the final disparity map, for example, a smaller value between $D_{21}(x_2)$ and $D_{23}(x_2)$ may be determined as a final disparity value. Specifically, a final disparity $D'_2(x_2)$ may be determined as $D'_2(x_2)=\min(D_{21}(x_2), D_{23}(x_2))$.

As described above, to calculate the global path by performing the dynamic programming on the three views, and to fill the occlusion region included in the global path with disparity information, the local matching may be performed on neighboring views, and thereby the disparity map with respect to the three views may be effectively calculated, and the occlusion region may be effectively supplemented.

Figure 7:
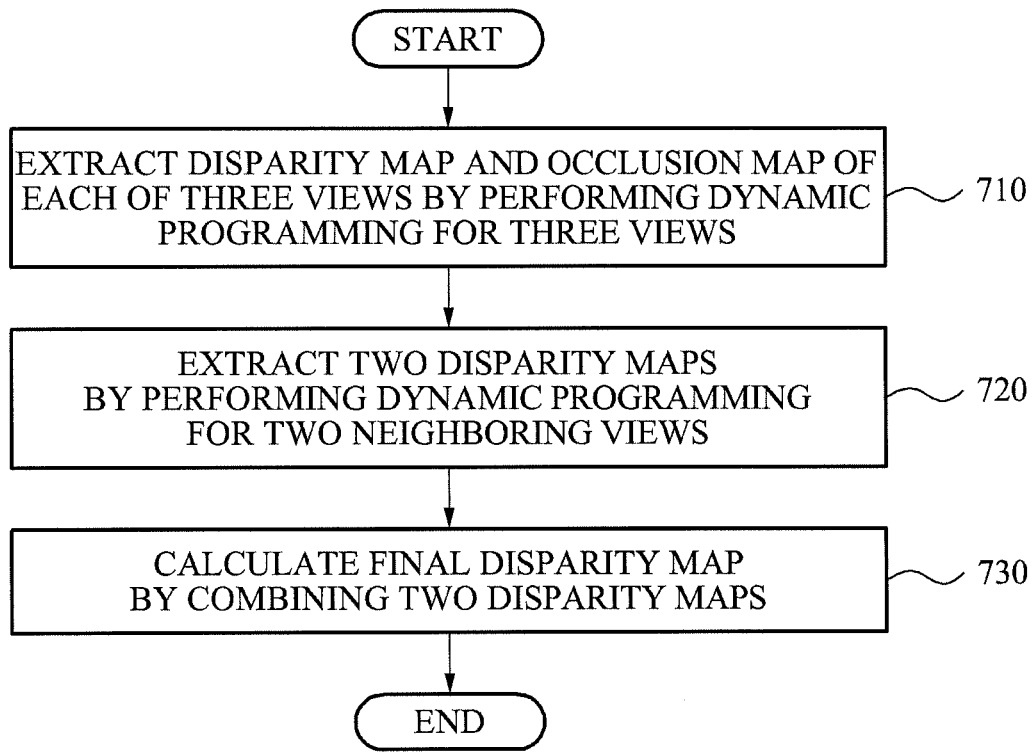
FIG. 7 is a flowchart illustrating a method of estimating a disparity of three view images according to exemplary embodiments.

FIG. 7 is a flowchart illustrating a method of estimating a disparity of three view images according to exemplary embodiments.

Referring to FIG. 7, in operation 710, the method may perform dynamic programming on three views corresponding to a left view, a center view, and a right view to extract a disparity map and an occlusion map of each of the three views. Here, operation 710 will be further described in detail with reference to FIG. 8.

Figure 8:
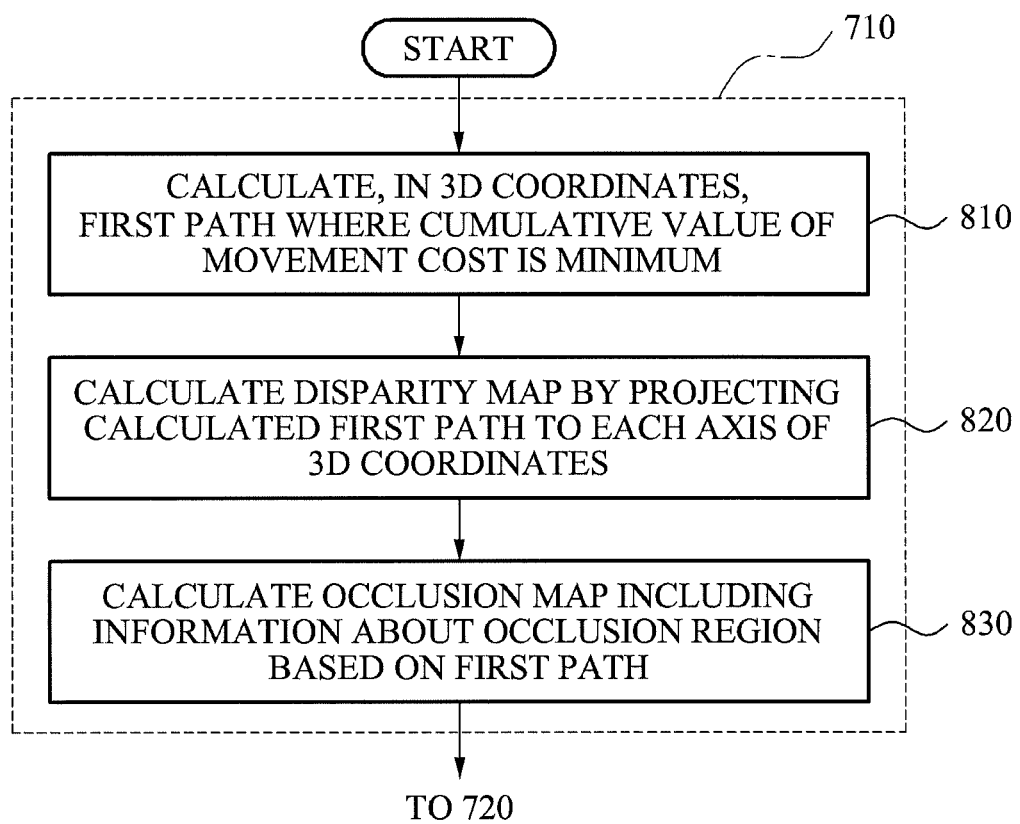
FIG. 8 is a flowchart illustrating a process of extracting a disparity map and an occlusion map of FIG. 7.

FIG. 8 is a flowchart illustrating a process of extracting the disparity map and an occlusion map of FIG. 7.

Referring to FIG. 8, in operation 810, a first path, in 3D coordinates, where a cumulative value of a movement cost is a minimum may be calculated. Here, the cumulative value of the movement cost may be determined by adding up a cumulative value of a movement cost up to a position prior to a movement and a matching cost for moving a cost from the position prior to the movement to a current position. In this instance, operation 810 will be further described in detail with reference to FIG. 9.

Figure 9:
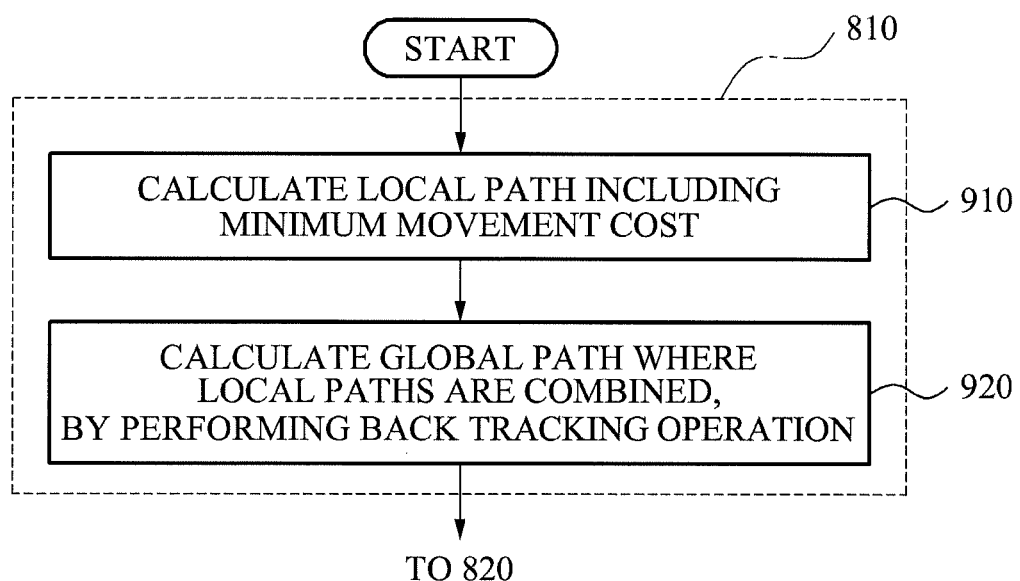
FIG. 9 is a flowchart illustrating a process of calculating a first path of FIG. 8.

FIG. 9 is a flowchart illustrating a process of calculating the first path of FIG. 8.

Referring to FIG. 9, in operation 910, a local path having a minimum movement cost may be calculated from among a first movement cost for a first movement where all values on a first axis, a second axis, and a third axis are increased by 1 unit, a second movement cost for a second movement where the value on the first axis is increased by 1 unit, the value on the second axis is increased by 0.5 units, and the value on the third axis is not increased, and a third movement cost for a third movement where the value on the first axis is not increased, the value on the second axis is increased by 0.5 units, and the value on the third axis is increased by 1 unit.

In operation 920, a back tracking operation may be performed in a direction of an arrival point of the first path to a starting point of the first path to thereby calculate the global path obtained by combining the local path.

Referring again to FIG. 8, in operation 820, the calculated first path may be projected to each axis of the 3D coordinates to calculate a disparity map. The 3D coordinates may be obtained by configuring the x-axis of each of the left view, the center view, and the right view to correspond to each of the first-axis, the second-axis, and the third-axis of the 3D coordinates.

In operation 830, an occlusion map including information about an occlusion region may be calculated based on the calculated first path. The occlusion map may be a binary map where a value of a map corresponding to the occlusion region is determined as one of '0' and '1'.

Referring again to FIG. 7, in operation 720, the dynamic programming may be performed on two neighboring views of the three views to extract two disparity maps where the occlusion region of the disparity map is supplemented. In this instance, when performing the dynamic programming to extract the two disparity maps, a tracking value signifying a degree of being separated from the global path calculated by the global matching may be added upon calculating the movement cost, and the tracking value may be not added to the occlusion region, and thereby a new path where the occlusion region is supplemented may be calculated.

In operation 730, a final disparity map may be calculated by combining the two disparity maps. To calculate the final disparity map, a smaller value between disparity values of the two disparity maps may be determined as a disparity value of the final disparity map.

In addition, portions of FIGS. 7 through 9 which have not been described may be understood by descriptions of FIGS. 1 through 6.

As described above, the dynamic programming may be performed on the three views, and the local matching for supplementing the occlusion region may be performed. As a result, a disparity estimation of three view images may be accurately and effectively performed.

The above described methods may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although example embodiments have been shown and described, it should be appreciated by those skilled in the art that changes may be made in these example embodiments without departing from the principles and spirit of the disclosure, the scope of which is defined in the claims and their equivalents.

What is claimed is:

1. An apparatus estimating a disparity of three view images, the apparatus comprising:
a global matching unit to calculate a first path in 3D coordinates where a cumulative value of a movement cost is a minimum by performing dynamic programming on three views, the three views corresponding to a left view, a center view, and a right view, to extract a disparity map and an occlusion map of each of the three views based on the first path;
a local matching unit to perform the dynamic programming on two neighboring views of the three views to extract two disparity maps where an occlusion region of the disparity map is supplemented; and a final map calculation unit to calculate a final disparity map by combining the two disparity maps, wherein the 3D coordinates are obtained by configuring an x-axis value of each of the left view, the center view, and the right view to correspond to a value of each of a first-axis, a second-axis, and a third-axis of the 3D coordinates.

2. The apparatus of claim 1, wherein the global matching unit comprises:
   a path calculation unit to calculate the first path in the 3D coordinates where a cumulative value of a movement cost is a minimum;
   a map calculation unit to calculate the disparity map by projecting the calculated first path to each axis of the 3D coordinates; and
   an occlusion map calculation unit to calculate the occlusion map including information about the occlusion region based on the calculated first path.

3. The apparatus of claim 2, wherein the path calculation unit comprises:
   a local path calculation unit to calculate local paths having a minimum movement cost from among a first movement cost for a first movement where each value on the first-axis, the second-axis, and the third-axis is increased by 1 unit, a second movement cost for a second movement where the value on the first-axis is increased by 1 unit, the value on the second-axis is increased by 0.5 units, and the value on the third-axis is not increased, and a third movement cost for a third movement where the value on the first-axis is not increased, the value on the second-axis is increased by 0.5 units, and the value on the third-axis is increased by 1 unit; and
   a global path calculation unit to calculate a global path where the local paths are combined, by performing a back tracking operation in a direction of an arrival point of the first path to a starting point of the first path.

4. The apparatus of claim 3, wherein:
   the first movement cost with respect to the first movement is a value obtained by adding up a movement cost with respect to the 3D coordinates prior to the first movement and a matching cost with respect to the first movement,
   the second movement cost with respect to the second movement is a value obtained by adding up a movement cost with respect to the 3D coordinates prior to the second movement, a product of a matching cost with respect to the values of the first-axis and the second-axis and a first constant and a second constant,
   the third movement cost with respect to the third movement is a value obtained by adding up a movement cost with respect to the 3D coordinates prior to the third movement, a product of a matching cost with respect to the values of the second-axis and the third-axis and the first constant and the second constant, and
   the matching cost is calculated using an intensity difference between positions corresponding to the two neighboring views.

5. The apparatus of claim 1, wherein the occlusion map is a binary map where a value of the occlusion map is determined as one of 0 and 1.

6. The apparatus of claim 3, wherein the local matching unit calculates a second path where a sum of a cumulative value and a tracking value is a minimum, the cumulative value indicating where a movement cost is a minimum, and the tracking value signifying a degree of separation from the global path.

7. The apparatus of claim 6, wherein the local matching unit does not apply the occlusion region of the occlusion map when calculating the tracking value.

8. The apparatus of claim 1, wherein the final map calculation unit calculates the final disparity map by determining, as a disparity value of the final disparity map with respect to the center view, a minimum from among disparity values of the two disparity maps.

9. A method of estimating a disparity of three view images, the method comprising:
   calculating a first path in 3D coordinates where a cumulative value of a movement cost is minimum by performing, by a computer, dynamic programming on three views, the three views corresponding to a left view, a center view, and a right view, to extract a disparity map and an occlusion map of each of the three views based on the first path;
   performing, by the computer, the dynamic programming on two neighboring views from among the three views to extract two disparity maps where an occlusion region of the disparity map is supplemented; and
   calculating, by the computer, a final disparity map by combining the two disparity maps,
   wherein the 3D coordinates are obtained by configuring an x-axis value of each of the left view, the center view, and the right view to correspond to a value of each of a first-axis, a second-axis, and a third-axis of the 3D coordinates.

10. The method of claim 9, wherein the performing of the dynamic programming on three views comprises:
    calculating the first path on the 3D coordinates where a cumulative value of a movement cost is a minimum;
    calculating the disparity map by projecting the calculated first path to each axis of the 3D coordinates; and
    calculating the occlusion map including information about the occlusion region based on the calculated first path.

11. The method of claim 10, wherein the calculating of the first path comprises:
    calculating local paths having a minimum movement cost from among a first movement cost for a first movement where each value on the first-axis, the second-axis, and the third-axis is increased by 1 unit, a second movement cost for a second movement where the value on the first-axis is increased by 1 unit, the value on the second-axis is increased by 0.5 units, and the value on the third-axis is not increased, and a third movement cost for a third movement where the value on the first-axis is not increased, the value on the second-axis is increased by 0.5 units, and the value on the third-axis is increased by 1 unit; and
    calculating a global path where the local paths are combined, by performing a back tracking operation in a direction of an arrival point of the first path to a starting point of the first path.

12. The method of claim 11, wherein:
    the first movement cost with respect to the first movement is a value obtained by adding up a movement cost with respect to the 3D coordinates prior to the first movement and a matching cost with respect to the first movement,
    the second movement cost with respect to the second movement is a value obtained by adding up a movement cost with respect to the 3D coordinates prior to the second movement, a product of a matching cost with respect to the values of the first-axis and the second-axis and a first constant and a second constant,
    the third movement cost with respect to the third movement is a value obtained by adding up a movement cost with respect to the 3D coordinates prior to the third movement, a product of a matching cost with respect to the values of the second-axis and the third-axis and the first constant and the second constant, and the matching cost being calculated using an intensity difference between positions corresponding to the two neighboring views.

13. The method of claim 9, wherein the occlusion map is a binary map where a value of the occlusion map corresponding to the occlusion region is determined as one of 0 and 1.

14. The method of claim 11, wherein the performing of the dynamic programming with respect to the neighboring two views includes calculating a second path where a sum of a cumulative value and a tracking value is a minimum, the cumulative value being where a movement cost is a minimum, and the tracking value signifying a degree of being separated from the global path.

15. The method of claim 14, wherein the performing of the dynamic programming with respect to the neighboring two views does not apply the occlusion region of the occlusion map when calculating the tracking value.

16. The method of claim 9, wherein the calculating of the final disparity map calculates the final disparity map by determining, as a disparity value of the final disparity map with respect to the center view, a minimum from among disparity values of the two disparity maps.

17. At least one non-transitory computer-readable medium comprising computer readable instructions implementing a method, comprising:
    calculating a first path in 3D coordinates where a cumulative value of a movement cost is minimum by performing dynamic programming on three views, the three views corresponding to a left view, a center view, and a right view, to extract a disparity map and an occlusion map of each of the three views based on the first path;
    performing the dynamic programming on two neighboring views from among the three views to extract two disparity maps where an occlusion region of the disparity map is supplemented; and
    calculating a final disparity map by combining the two disparity maps,
    wherein the 3D coordinates are obtained by configuring an x-axis value of each of the left view, the center view, and the right view to correspond to a value of each of a first-axis, a second-axis, and a third-axis of the 3D coordinates.

18. The at least one non-transitory computer-readable medium of claim 17, wherein the performing of the dynamic programming on three views comprises:
    calculating the first path on the 3D coordinates where a cumulative value of a movement cost is a minimum;
    calculating the disparity map by projecting the calculated first path to each axis of the 3D coordinates; and
    calculating the occlusion map including information about the occlusion region based on the calculated first path.

19. The at least one non-transitory computer-readable medium of claim 18, wherein the calculating of the first path comprises:
    calculating local paths having a minimum movement cost from among a first movement cost for a first movement where each value on the first-axis, the second-axis, and the third-axis is increased by 1 unit, a second movement cost for a second movement where the value on the first-axis is increased by 1 unit, the value on the second-axis is increased by 0.5 units, and the value on the third-axis is not increased, and a third movement cost for a third movement where the value on the first-axis is not increased, the value on the second-axis is increased by 0.5 units, and the value on the third-axis is increased by 1 unit; and
    calculating a global path where the local paths are combined, by performing a back tracking operation in a direction of an arrival point of the first path to a starting point of the first path.

20. The at least one non-transitory computer-readable medium of claim 19, wherein:
    the first movement cost with respect to the first movement is a value obtained by adding up a movement cost with respect to the 3D coordinates prior to the first movement and a matching cost with respect to the first movement,
    the second movement cost with respect to the second movement is a value obtained by adding up a movement cost with respect to the 3D coordinates prior to the second movement, a product of a matching cost with respect to the values of the first-axis and the second-axis and a first constant and a second constant,
    the third movement cost with respect to the third movement is a value obtained by adding up a movement cost with respect to the 3D coordinates prior to the third movement, a product of a matching cost with respect to the values of the second-axis and the third-axis and the first constant and the second constant, and
    the matching cost being calculated using an intensity difference between positions corresponding to the two neighboring views.

21. The at least one non-transitory computer-readable medium of claim 17, wherein the occlusion map is a binary map where a value of the occlusion map corresponding to the occlusion region is determined as one of 0 and 1.

22. The at least one non-transitory computer-readable medium of claim 19, wherein the performing of the dynamic programming with respect to the neighboring two views includes calculating a second path where a sum of a cumulative value and a tracking value is a minimum, the cumulative value being where a movement cost is a minimum, and the tracking value signifying a degree of being separated from the global path.

23. The at least one non-transitory computer-readable medium of claim 22, wherein the performing of the dynamic programming with respect to the neighboring two views does not apply the occlusion region of the occlusion map when calculating the tracking value.

24. The at least one non-transitory computer-readable medium of claim 17, wherein the calculating of the final disparity map calculates the final disparity map by determining, as a disparity value of the final disparity map with respect to the center view, a minimum from among disparity values of the two disparity maps.

* * * * *